United States Patent
Kurebayashi et al.

(10) Patent No.: US 11,414,735 B2
(45) Date of Patent: Aug. 16, 2022

(54) HEAT-RESISTANT CAST STEEL AND TURBOCHARGER PART

(71) Applicant: IHI Corporation, Koto-ku (JP)

(72) Inventors: Koichi Kurebayashi, Tokyo (JP); Yasuo Matsunaga, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/871,112

(22) Filed: May 11, 2020

(65) Prior Publication Data

US 2020/0270728 A1 Aug. 27, 2020

Related U.S. Application Data

(63) Continuation of application No. PCT/JP2018/042162, filed on Nov. 14, 2018.

(30) Foreign Application Priority Data

Dec. 28, 2017 (JP) .............................. JP2017-254007
Jun. 18, 2018 (JP) .............................. JP2018-115359

(51) Int. Cl.
| | |
|---|---|
| *C22C 38/44* | (2006.01) |
| *C22C 38/02* | (2006.01) |
| *C22C 38/04* | (2006.01) |
| *C22C 38/60* | (2006.01) |
| *F02C 6/12* | (2006.01) |

(52) U.S. Cl.
CPC .............. *C22C 38/44* (2013.01); *C22C 38/02* (2013.01); *C22C 38/04* (2013.01); *C22C 38/60* (2013.01); *F02C 6/12* (2013.01)

(58) Field of Classification Search
CPC ......... C22C 38/44; C22C 38/02; C22C 38/04; C22C 38/60; F02C 6/12
USPC ........................................................ 428/544
See application file for complete search history.

(56) References Cited

U.S. PATENT DOCUMENTS

| | | |
|---|---|---|
| 5,067,715 A | 11/1991 | Schmidt et al. |
| 5,163,682 A | 11/1992 | Schmidt et al. |
| 5,180,166 A | 1/1993 | Schmidt et al. |
| 5,240,252 A | 8/1993 | Schmidt et al. |
| 5,301,945 A | 4/1994 | Schmidt et al. |

(Continued)

FOREIGN PATENT DOCUMENTS

| | | |
|---|---|---|
| CN | 102844455 A | 12/2012 |
| CN | 101946018 B | 1/2013 |

(Continued)

OTHER PUBLICATIONS

Kawaura et al., JP2004269979 A machine translation, Sep. 30, 2004, entire translation (Year: 2004).*

(Continued)

*Primary Examiner* — Humera N. Sheikh
*Assistant Examiner* — Katherine A Christy
(74) *Attorney, Agent, or Firm* — Oblon, McClelland, Maier & Neustadt, L.L.P.

(57) ABSTRACT

A heat-resistant cast steel contains 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, and more than 0 mass % and 0.6 mass % or less Mo, and the balance being Fe and unavoidable impurities.

21 Claims, 4 Drawing Sheets

(56) References Cited

U.S. PATENT DOCUMENTS

| | | | |
|---|---|---|---|
| 5,318,300 | A | 6/1994 | Schmidt et al. |
| 5,351,958 | A | 10/1994 | Helmstetter |
| D352,984 | S | 11/1994 | Helmstetter et al. |
| 5,460,376 | A | 10/1995 | Schmidt et al. |
| 5,470,068 | A | 11/1995 | Schmidt et al. |
| 5,470,069 | A | 11/1995 | Schmidt et al. |
| D365,130 | S | 12/1995 | Schmidt et al. |
| 5,474,296 | A | 12/1995 | Schmidt et al. |
| 5,480,152 | A | 1/1996 | Schmidt et al. |
| 5,489,416 | A | 2/1996 | Takahashi et al. |
| 5,611,741 | A | 3/1997 | Schmidt et al. |
| 5,697,853 | A | 12/1997 | Schmidt et al. |
| 6,027,416 | A | 2/2000 | Schmidt et al. |
| 9,163,303 | B2 | 10/2015 | Genma et al. |
| 10,626,487 | B2 | 4/2020 | Ohtake et al. |
| 2011/0000200 | A1 | 1/2011 | Kawabata |
| 2013/0022488 | A1 | 1/2013 | Genma et al. |
| 2016/0068936 | A1 | 3/2016 | Ohtake et al. |
| 2016/0130978 | A1 | 5/2016 | Chintalapati et al. |
| 2017/0298489 | A1 | 10/2017 | Kimura et al. |

FOREIGN PATENT DOCUMENTS

| | | | |
|---|---|---|---|
| CN | 105074031 A | | 11/2015 |
| JP | 49-655 B | | 1/1974 |
| JP | 4-269979 A | | 9/1992 |
| JP | 6-228712 A | | 8/1994 |
| JP | 6-254666 A | | 9/1994 |
| JP | 11-323479 A | | 11/1999 |
| JP | 2004269979 A | * | 9/2004 |
| JP | 2011-219801 A | | 11/2011 |
| JP | 2011-252208 A | | 12/2011 |
| WO | WO 2016/052750 A1 | | 4/2016 |

OTHER PUBLICATIONS

Combined Chinese Office Action and Search Report dated March 24, 2021 in Chinese Patent Application No. 2018800836842 (with English translation of Categories of Cited Documents), 8 pages Chen Qi, et al., "Chinese and Foreign Casting Materials, Quick Reference Manual" Shenyang: Liaoning Science and Technology Press, Feb. 28, 2015, 8 pages.

International Search Report dated Feb. 12, 2019 in PCT/JP2018/042162 filed Nov. 14, 2018, 2 pages

* cited by examiner

HEAT-RESISTANT CAST STEEL AND TURBOCHARGER PART

CROSS REFERENCE TO RELATED APPLICATIONS

This application is a continuation application of International Application No. PCT/JP2018/042162, filed on Nov. 14, 2018, which claims priority to Japanese Patent Application No. 2017-254007, filed on Dec. 28, 2017 and Japanese Patent Application No. 2018-115359, filed on Jun. 18, 2018, the entire contents of which are incorporated by references herein.

BACKGROUND

1. Field

The present disclosure relates to a heat-resistant cast steel and a turbocharger part.

2. Description of the Related Art

Turbocharger parts such as a turbine housing need to be heat resistant, and therefore are formed by using heat-resistant cast steels. A heat-resistant cast steel containing N (nitrogen) is used as such a heat-resistant cast steel. See U.S. Patent Application Publication No. 2016/0130978 (Patent Literature 1).

SUMMARY

In the heat-resistant cast steel containing N (nitrogen), N is added to stabilize the austenite phase. The heat-resistant cast steel containing N is casted in a pressure casting method to add a N gas. The pressure casting method needs a special casting facility to perform melting and casting under pressure. Accordingly, the cost of the facility for casting the heat-resistant cast steel is so high that the manufacturing cost of the heat-resistant cast steel may increase.

An object of the present disclosure is to provide a heat-resistant cast steel and a turbocharger part which can further reduce the manufacturing cost of a heat-resistant cast steel.

A heat-resistant cast steel contains 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, and the balance being Fe and unavoidable impurities.

In the heat-resistant cast steel according to the present disclosure, a content of C may be 0.55 mass % or more and 0.8 mass % or less.

In the heat-resistant cast steel according to the present disclosure, a content of C may be more than 0.8 mass % and 1.0 mass % or less.

In the heat-resistant cast steel according to the present disclosure, a content of Si may be 1.5 mass % or more and 2.5 mass % or less.

The heat-resistant cast steel according to the present disclosure, more than 0 mass % and 0.2 mass % or less S may further be included.

In the heat-resistant cast steel according to the present disclosure, a content of S is 0.1 mass % or more and 0.2 mass % or less.

A turbocharger part according the present disclosure is made of any one of the heat-resistant cast steels described above.

According to the aforementioned configuration, since no N (nitrogen) added to the heat-resistant cast steel, there is no need to use the pressure casting method. Accordingly, the manufacturing cost of the heat-resistant cast steel can be reduced.

DESCRIPTION OF EMBODIMENTS

Figure 1:
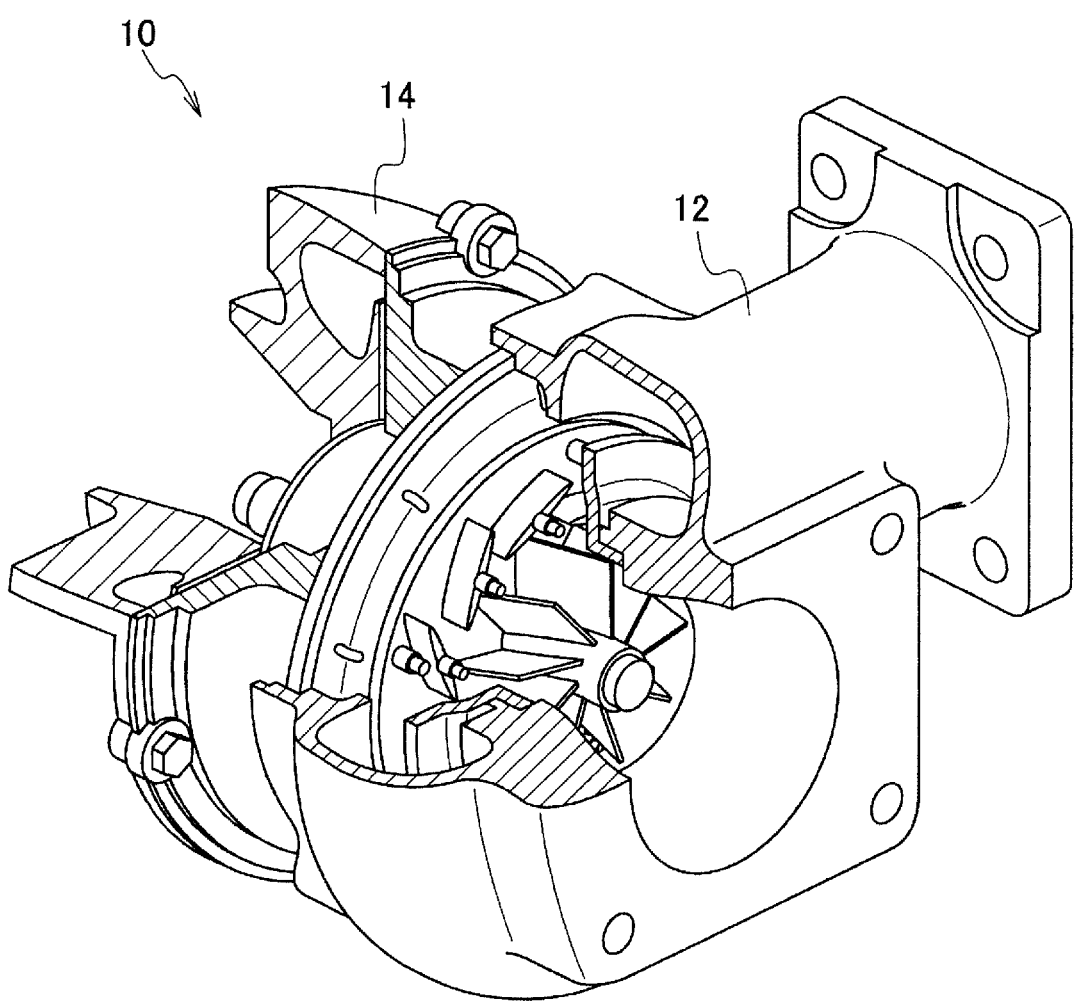
FIG. 1 is a schematic view illustrating a configuration of a turbocharger in an embodiment of the present disclosure.

An embodiment of the present disclosure is described below in detail by using the drawings. A heat-resistant cast steel according to the embodiment of the present disclosure contains 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, and the balance being Fe and unavoidable impurities. Next, description is given of reasons of limiting the composition range of each of the alloy components contained in the heat-resistant cast steel.

C (carbon) is an austenite forming element and has a function of stabilizing the austenite phase. The heat-resistant cast steel can have better mechanical properties such as high temperature strength in the case where the main phase of the metallographic structure of the heat-resistant cast steel is the austenite phase (γ phase) than in the case where the main phase of the metallographic structure is the ferrite phase (α phase) or the like. Note that the main phase of the metallographic structure refers to a phase with the greatest volume fraction in the metallographic structure. Moreover, C combines with Cr to form a complex carbide such as Cr carbide in the metallographic structure and has a function of improving the mechanical properties such as high temperature strength.

The C content may be 0.55 mass % or more and 1.0 mass % or less. When the C content is less than 0.55 mass %, the amount of ferrite phase increases and the mechanical properties such as high temperature strength decrease. Moreover, when the C content is less than 0.55 mass %, the σ phase precipitates and the heat-resistant cast steel becomes brittle. When the C content is greater than 1.0 mass %, hardness increases due to precipitation of a large amount of Cr carbide and the like and processability such as machinability decreases.

The C content may be 0.55 mass % or more and 0.8 mass % or less. Causing the heat-resistant cast steel to have the C content of 0.55 mass % or more and 0.8 mass % or less reduces the hardness and the processability such as machinability can be thus improved. The C content may be more than 0.8 mass % and 1.0 mass % or less. Causing the heat-resistant cast steel to have the C content of more than 0.8 mass % and 1.0 mass % or less can further improve the mechanical properties such as high temperature strength.

Si (silicon) is a solid solution strengthening element and also has a function of improving oxidation resistance. The Si content may be 1.5 mass % or more and 3.5 mass % or less. When the Si content is less than 1.5 mass %, the oxidation resistance decreases. When the Si content is more than 3.5 mass %, the amount of ferrite phase increases and the mechanical properties such as high temperature strength decrease. Moreover, when the Si content is more than 3.5 mass %, the σ phase precipitates and the heat-resistant cast steel becomes brittle.

The Si content may be 1.5 mass % or more and 2.5 mass % or less. Causing the heat-resistant cast steel to have the Si content of 1.5 mass % or more and 2.5 mass % or less can improve the oxidation resistance and also further improve the mechanical properties such as high temperature strength.

Mn (manganese) is an austenite forming element and has a function of stabilizing the austenite phase. The Mn content may be more than 0 mass % and 2 mass % or less. When the Mn content is more than 2 mass %, MnS and the like are formed and this formation decreases the oxidation resistance.

Ni (nickel) is an austenite forming element and has a function of stabilizing the austenite phase. Moreover, Ni has a function of improving the oxidation resistance. The Ni content may be 6 mass % or more and 11 mass % or less. When the Ni content is less than 6 mass %, the amount of ferrite phase increases and the mechanical properties such as high temperature strength decrease. Moreover, when the Ni content is less than 6 mass %, the oxidation resistance decreases. Furthermore, when the Ni content is less than 6 mass %, the σ phase precipitates and the heat-resistant cast steel becomes brittle.

Meanwhile, when the Ni content is greater than 11 mass %, the manufacturing cost of the heat-resistant cast steel increases because Ni is an expensive element. Specifically, in the heat-resistant cast steel, the austenite phase is stabilized by causing the heat-resistant cast steel to have the C content of 0.55 mass % or more and 1.0 mass % or less to make the C amount greater than that in a normal heat-resistant cast steel. Accordingly, there is no need to stabilize the austenite phase by causing the heat-resistant cast steel to have the Ni content of more than 11 mass %. Moreover, causing the heat-resistant cast steel to have the Si content of 1.5 mass % or more and 3.5 mass % or less and to have the Cr content of 22 mass % or more and 27 mass % or less as described later increases the Si amount and the Cr amount and improves the oxidation resistance. Since the austenite phase is stabilized by increasing the content of inexpensive C and the oxidation resistance is improved by increasing the content amounts of inexpensive Si and Cr as described above, it is possible to reduce the content amount of expensive Ni and further reduce the manufacturing cost of the heat-resistant cast steel.

Cr (chromium) has a function of improving the oxidation resistance and corrosion resistance. The Cr content may be 22 mass % or more and 27 mass % or less. When the Cr content is less than 22 mass %, the oxidation resistance and corrosion resistance decreases. When the Cr content is more than 27 mass %, the amount of ferrite phase increases and the mechanical properties such as high temperature strength decrease. Moreover, when the Cr content is more than 27 mass %, the σ phase precipitates and the heat-resistant cast steel becomes brittle.

Mo (molybdenum) is a solid solution strengthening element and has a function of improving the mechanical properties such as high temperature strength. The Mo content may be more than 0 mass % and 0.6 mass % or less. When the Mo content is more than 0.6 mass %, the amount of ferrite phase increases and the mechanical properties such as high temperature strength decrease. Moreover, when the Mo content is more than 0.6 mass %, the σ phase precipitates and the heat-resistant cast steel becomes brittle. Moreover, in the heat-resistant cast steel, the mechanical properties such as high temperature strength are improved by causing the heat-resistant cast steel to have the C content of 0.55 mass % or more and 1.0 mass % or less to make the C amount greater than that in a normal heat-resistant cast steel. Accordingly, the content of expensive Mo does not have to be more than 0.6 mass %, and the manufacturing cost of the heat-resistant cast steel can be reduced.

Note that the balance of the heat-resistant cast steel is Fe and unavoidable impurities. The unavoidable impurities are impurities which may be mixed in the heat-resistant cast steel but are not intentionally added.

The heat-resistant cast steel according to the embodiment of the present disclosure may further contain S (sulfur) instead of part of Fe in the balance. S (sulfur) has a function of improving the machinability of the heat-resistant cast steel. The S content may be more than 0 mass % and 0.2 mass % or less. When the S content is more than 0.2 mass %, a brittle phase tends to be formed in high temperature exposure and the mechanical strength such as high temperature strength may thus decrease. The S content may be 0.1 mass % or more and 0.2 mass % or less. Causing the heat-resistant cast steel to have the S content of 0.1 mass % or more and 0.2 mass % or less can further improve the machinability. Moreover, causing the heat-resistant cast steel to have the S content of 0.16 mass % or more and 0.2 mass % or less can improve the machinability even further.

Next, a method of manufacturing the heat-resistant cast steel is described. A raw-material to be the heat-resistant cast steel can be melted in a high-frequency induction furnace or the like and casted to obtain an ingot. For example, the raw material to be the heat-resistant cast steel can be melted in the high-frequency induction furnace and casted by being poured into a sand mold. An alloy material containing 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, and the balance being Fe and unavoidable impurities may be used as the raw material of the heat-resistant cast steel. The raw material of the heat-resistant cast steel may further contain more than 0 mass % and 0.2 mass % or less S instead of part of Fe in the balance.

Since the heat-resistant cast steel according to the embodiment of the present disclosure can be casted in a general sand mold casting method and the like for cast steel as described above, casting in the pressure casting method is unnecessary. Accordingly, a special casting facility used in the pressure casting method is unnecessary and the manufacturing cost of the heat-resistant cast steel can be thus reduced. Moreover, since the heat-resistant cast steel has excellent oxidation resistance, the heat-resistant cast steel can be casted in an oxidizing atmosphere such as air atmosphere. Furthermore, the casted heat-resistant cast steel can be subjected to homogenization treatment such as annealing and to thermal treatment such as aging.

Next, the metallographic structure of the heat-resistant cast steel is described. In the metallographic structure of the heat-resistant cast steel, the main phase of the metallographic structure is formed of the austenite phase (γ phase). The volume fraction of the austenite phase in the metallographic structure may be 90 vol % or more, or may be 95 vol % or more. The metallographic structure of the heat-resistant cast steel may be such that the ferrite percentage of the ferrite phase (α phase) in the metallographic structure is 1.1% or less (including the case where the ferrite percentage is zero) in measurement using a magnetic induction method (Feritscope) at room temperature. The magnetic induction method is a method of measuring the ferrite percentage by using a magnetic apparatus and is a measurement method using the fact that the ferrite phase is magnetic and the austenite phase, carbides, and the like are non-magnetic. As described above, the heat-resistant cast steel may be an austenite heat-resistant cast steel in which the main phase of the metallographic structure is the austenite phase and the ferrite percentage is 1.1% or less (including the case where the ferrite percentage is zero). The metallographic structure of the heat-resistant cast steel contains no ferrite phase or little, specifically 1.1% or less, if any. Accordingly, the mechanical properties such as high temperature strength can be improved. Moreover, the ferrite percentage of the metallographic structure of the heat-resistant cast steel may be 0.5% or less (including the case where the ferrite percentage is zero) or may be 0.2% or less (including the case where the ferrite percentage is zero). Furthermore, the ferrite percentage of the metallographic structure of the heat-resistant cast steel may be zero (contain no ferrite phase).

A carbide such as Cr carbide may precipitate in the metallographic structure of the heat-resistant cast steel. Causing the carbide such as Cr carbide to precipitate in the metallographic structure in a dispersed manner can improve the mechanical properties such as high temperature strength. No phase may precipitate in the metallographic structure of the heat-resistant cast steel. Preventing the α phase from being contained in the metallographic structure of the heat-resistant cast steel can suppress the embrittlement of the heat-resistant cast steel. Moreover, the metallographic structure of the heat-resistant cast steel contains a large amount of Si and Cr in a solid solution state. Protection oxidized films made of a silicon oxide such as $SiO_2$ and a chromium oxide such as $Cr_2O_3$ which have excellent oxidation resistance are thereby formed when the heat-resistant cast steel is exposed to heat in the air atmosphere, and the oxidation resistance of the heat-resistant cast steel can be improved.

Next, the mechanical properties and the like of the heat-resistant cast steel according to the embodiment of the present disclosure are described. For example, the heat-resistant cast steel has the following high temperature tensile properties at 600° C., the tensile strength is 378 MPa to 446 MPa, the 0.2% proof stress is 173 MPa to 214 MPa, and the elongation is 9.4% to 14.2%. For example, the heat-resistant cast steel has the following high temperature tensile properties at 950° C., the tensile strength is 106 MPa to 131 MPa, the 0.2% proof stress is 55 MPa to 73 MPa, and the elongation is 35.0% to 52.3%. For example, the heat-resistant cast steel has such properties that Vickers hardness at room temperature is Hv 199 to Hv 234. For example, the heat-resistant cast steel has such oxidation resistance properties that, when a cyclic oxidation test is performed 200 times between temperature below 200° C. and 980° C. in the air atmosphere, the post-oxidation test weight loss amount (amount of weight loss per unit area) is about 5 mg·cm$^{-2}$ to about 22 mg·cm$^{-2}$. As described above, the heat-resistant cast steel according to the embodiment of the present disclosure has excellent mechanical properties and excellent oxidation resistance.

The heat-resistant cast steel according to the embodiment of the present disclosure can be applied to, for example, turbocharger parts for a vehicle such as an automobile. Specifically, the heat-resistant cast steel can be used as a material of a turbine housing which is a turbocharger part for a vehicle. FIG. 1 is a schematic view illustrating a configuration of a turbocharger 10. The turbocharger 10 includes a turbine housing 12 and a compressor housing 14. For example, the turbine housing 12 is thermally exposed to exhaust gas of about 980° C. at maximum in an oxidizing atmosphere. Forming the turbine housing 12 by using the heat-resistant cast steel allows the turbine housing 12 to have oxidation resistance and mechanical properties such as high temperature strength. Moreover, since the heat-resistant cast steel has excellent processability such as machinability, the heat-resistant cast steel can be easily processed into a predetermined shape of the turbine housing 12. As a matter of course, the heat-resistant cast steel according to the embodiment of the present disclosure can be applied not only to the turbocharger parts such as the turbine housing 12 but also to other mechanical apparatuses and the like.

As described above, the heat-resistant cast steel according to the embodiment of the present disclosure contains 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, and the balance being Fe and unavoidable impurities. Accordingly, there is no need to add N (nitrogen) and stabilize the austenite phase and the special facility used for the pressure casting method is unnecessary. The manufacturing cost of the heat-resistant cast steel can be thereby reduced.

In the heat-resistant cast steel according to the embodiment of the present disclosure, it is possible to improve the mechanical properties such as high temperature strength and also improve the oxidation resistance. Moreover, in the heat-resistant cast steel according to the embodiment of the present disclosure, the content of inexpensive C is increased to stabilize the austenite phase and the content amounts of inexpensive Si and Cr are increased to improve the oxidation resistance. This enables reduction of the content amount of expensive Ni and the manufacturing cost of the heat-resistant cast steel can be thereby further reduced.

Moreover, the heat-resistant cast steel according to the embodiment of the present disclosure contains 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, more than 0 mass % and 0.2 mass % or less S, and the balance being Fe and unavoidable impurities. Accordingly, the heat-resistant cast steel can be further improved in machinability while having the aforementioned effects.

EXAMPLES

First Example

Heat-resistant cast steels were casted and the mechanical properties (tensile properties, hardness), the ferrite percentage, and the oxidation resistance thereof were evaluated. Table 1 depicts the alloy compositions of the casted heat-resistant cast steels.

TABLE 1

| | ALLOY COMPOSITION (MASS %) | | | | | | | OXIDATION WEIGHT LOSS AMOUNT/mg·cm$^{-2}$ | TENSILE STRENGTH/MPa | |
|---|---|---|---|---|---|---|---|---|---|---|
| | C | Si | Mn | Ni | Cr | Mo | Fe+ IMPURITIES | 980° C. | 600° C. | 950° C. |
| EXAMPLE 1 | 0.77 | 2.01 | 1.23 | 10.30 | 24.68 | 0.56 | BALANCE | 15 | 395 | 122 |
| EXAMPLE 2 | 0.72 | 1.84 | 1.38 | 10.70 | 26.80 | 0.46 | BALANCE | 5 | 378 | 114 |
| EXAMPLE 3 | 0.65 | 2.08 | 0.85 | 10.43 | 23.75 | 0.45 | BALANCE | 16 | — | — |
| EXAMPLE 4 | 0.72 | 3.11 | 1.40 | 10.31 | 24.84 | 0.44 | BALANCE | 19 | 394 | 106 |
| EXAMPLE 5 | 0.91 | 1.82 | 1.07 | 9.72 | 24.05 | 0.34 | BALANCE | 13 | 407 | 121 |
| EXAMPLE 6 | 0.86 | 1.92 | 1.32 | 6.89 | 25.74 | 0.45 | BALANCE | 10 | 446 | 131 |
| EXAMPLE 7 | 0.84 | 1.89 | 1.37 | 8.35 | 24.16 | 0.46 | BALANCE | 17 | 406 | 116 |
| EXAMPLE 8 | 0.68 | 1.94 | 0.97 | 10.66 | 22.87 | 0.36 | BALANCE | 13 | — | — |
| COMPARATIVE EXAMPLE 1 | 0.96 | 0.95 | 3.21 | 6.64 | 24.14 | 0.40 | BALANCE | 304 | 437 | 139 |
| COMPARATIVE EXAMPLE 2 | 0.57 | 1.73 | 1.01 | 8.56 | 21.92 | 0.44 | BALANCE | 94 | 434 | 113 |
| COMPARATIVE EXAMPLE 3 | 1.13 | 1.68 | 0.97 | 10.18 | 24.07 | 0.35 | BALANCE | 13 | — | — |
| COMPARATIVE EXAMPLE 4 | 0.3 | 1.8 | 1.26 | 6.49 | 25 | 0.37 | BALANCE | — | — | — |
| COMPARATIVE EXAMPLE 5 | 0.68 | 4.11 | 1.26 | 6.40 | 24.6 | 0.34 | BALANCE | — | — | — |
| COMPARATIVE EXAMPLE 6 | 0.69 | 2.27 | 1.23 | 3.70 | 25.60 | 0.32 | BALANCE | — | — | — |
| COMPARATIVE EXAMPLE 7 | 0.70 | 1.79 | 1.26 | 6.54 | 31.30 | 0.23 | BALANCE | — | — | — |

| | 0.2% PROOF STRESS/MPa | | ELONGATION/% | | HARDNESS Hv | FERRITE PERCENTAGE/% |
|---|---|---|---|---|---|---|
| | 600° C. | 950° C. | 600° C. | 950° C. | RT | RT |
| EXAMPLE 1 | 190 | 65 | 10.2 | 38.1 | 208 | 0.00 |
| EXAMPLE 2 | 173 | 62 | 14.2 | 48.3 | 199 | 0.38 |
| EXAMPLE 3 | — | — | — | — | 200 | 0.00 |
| EXAMPLE 4 | 188 | 55 | 12.4 | 52.3 | 215 | 0.15 |
| EXAMPLE 5 | 194 | 67 | 10.9 | 51.6 | 220 | 0.13 |
| EXAMPLE 6 | 214 | 73 | 9.4 | 37.6 | 234 | 1.08 |
| EXAMPLE 7 | 188 | 62 | 10.3 | 47.55 | 218 | 0.14 |
| EXAMPLE 8 | — | — | — | — | 200 | 0.00 |
| COMPARATIVE EXAMPLE 1 | 205 | 78 | 8.2 | 39.2 | 235 | 0.00 |
| COMPARATIVE EXAMPLE 2 | 174 | 65 | 20.0 | 39.4 | 205 | 0.21 |
| COMPARATIVE EXAMPLE 3 | — | — | — | — | 240 | 0.12 |
| COMPARATIVE EXAMPLE 4 | — | — | — | — | — | 3.06 |
| COMPARATIVE EXAMPLE 5 | — | — | — | — | — | 20.88 |
| COMPARATIVE EXAMPLE 6 | — | — | — | — | — | 11.64 |
| COMPARATIVE EXAMPLE 7 | — | — | — | — | — | 18.22 |

First, the alloy composition of each heat-resistant cast steel is described. The alloy compositions of the heat-resistant cast steels in Examples 1 to 8 were each configured to contain 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, and the balance being Fe and unavoidable impurities.

In the heat-resistant cast steel of Comparative Example 1, the Si amount was 0.95 mass % and effects of reducing the Si amount were evaluated. Moreover, in the heat-resistant cast steel of Comparative Example 1, the Mn amount was 3.21 mass % and effects of increasing the Mn amount were evaluated. In the heat-resistant cast steel of Comparative Example 2, the Cr amount was 21.92 mass % and effects of reducing the Cr amount were evaluated. In the heat-resistant cast steel of Comparative Example 3, the C amount was 1.13 mass % and effects of increasing the C amount were evaluated. In the heat-resistant cast steel of Comparative Example 4, the C amount was 0.3 mass % and effects of reducing the C amount were evaluated. In the heat-resistant cast steel of Comparative Example 5, the Si amount was 4.11 mass % and effects of increasing the Si amount were evaluated. In the heat-resistant cast steel of Comparative Example 6, the Ni amount was 3.70 mass % and effects of reducing the Ni amount were evaluated. In the heat-resistant cast steel of Comparative Example 7, the Cr amount was 31.30 mass % and effects of increasing the Cr amount were evaluated. Each heat-resistant cast steel was casted by melting an alloy raw material in a high-frequency induction furnace and pouring it into a sand mold in the air atmosphere.

(Evaluation of Ferrite Percentage)

The ferrite percentage of each heat-resistant cast steel was measured. The ferrite percentage of each heat-resistant cast steel was measured by using a magnetic induction method (Feritscope) at room temperature. Table 1 depicts the ferrite percentage of each heat-resistant cast steel.

Figure 2:
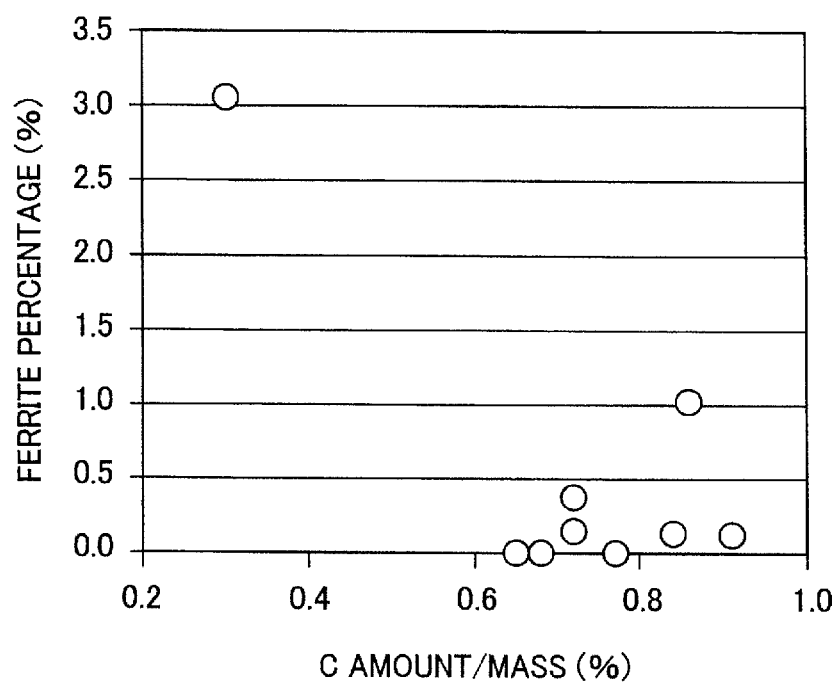
FIG. 2 is a graph illustrating relationships between ferrite percentages and amounts of C contained in heat-resistant cast steels in the embodiment of the present disclosure.

FIG. 2 is a graph illustrating relationships between the ferrite percentages and the amounts of C contained in the heat-resistant cast steels. In the graph of FIG. 2, the horizontal axis represents the amount of C contained in each heat-resistant cast steel while the vertical axis represents the ferrite percentage and each of white circles represents the ferrite percentage for the corresponding C amount. Note that FIG. 2 illustrates the relationships between the ferrite percentages and the C amounts in the heat-resistant cast steels of Examples 1 to 8 and Comparative Example 4. The heat-resistant cast steel of Comparative Example 4 (C amount was 0.3 mass %) had a greater ferrite percentage than the heat-resistant cast steels of Examples 1 to 8. From this result, it was found that, when the C amount is less than 0.55 mass %, the amount of ferrite phase increases, meanwhile, when the C amount is 0.55 mass % or more, the ferrite percentage is 1.1% or less (including the case where the ferrite percentage is zero) and it is possible to reduce the amount of ferrite phase and increase the amount of austenite phase.

Figure 3:
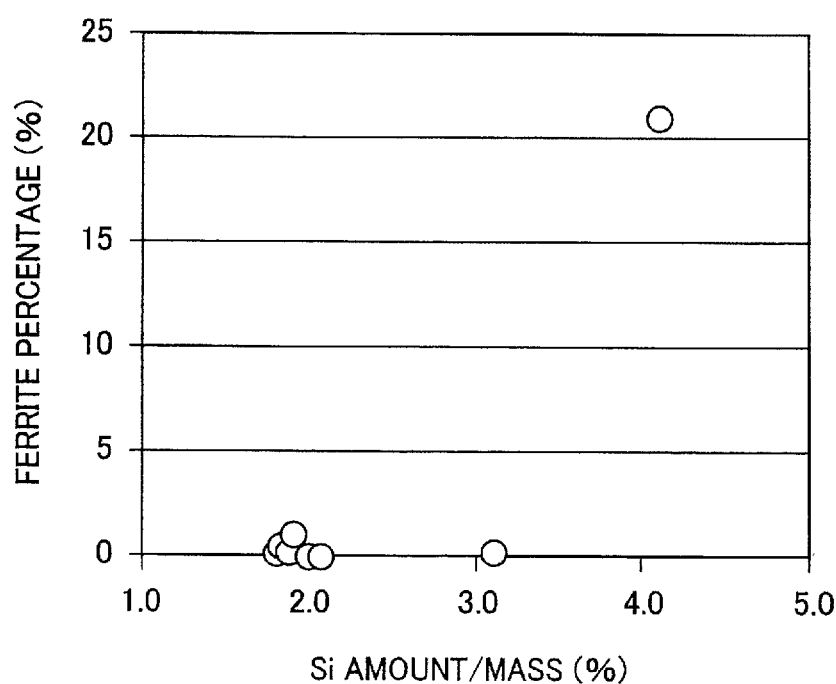
FIG. 3 is a graph illustrating relationships between the ferrite percentages and amounts of Si contained in the heat-resistant cast steels in the embodiment of the present disclosure.

FIG. 3 is a graph illustrating relationships between the ferrite percentages and the amounts of Si contained in the heat-resistant cast steels. In the graph of FIG. 3, the horizontal axis represents the amount of Si contained in each heat-resistant cast steel while the vertical axis represents the ferrite percentage and each of white circles represents the ferrite percentage for the corresponding Si amount. Note that FIG. 3 illustrates the relationships between the ferrite percentages and the Si amounts in the heat-resistant cast steels of Example 1 to 8 and Comparative Example 5. The heat-resistant cast steel of Comparative Example 5 (Si amount was 4.11 mass %) had a greater ferrite percentage than the heat-resistant cast steels of Examples 1 to 8. From this result, it was found that, when the Si amount is more than 3.5 mass %, the amount of ferrite phase increases, meanwhile, when the Si amount is 3.5 mass % or less, the ferrite percentage is 1.1% or less (including the case where the ferrite percentage is zero) and it is possible to reduce the amount of ferrite phase and increase the amount of austenite phase.

Figure 4:
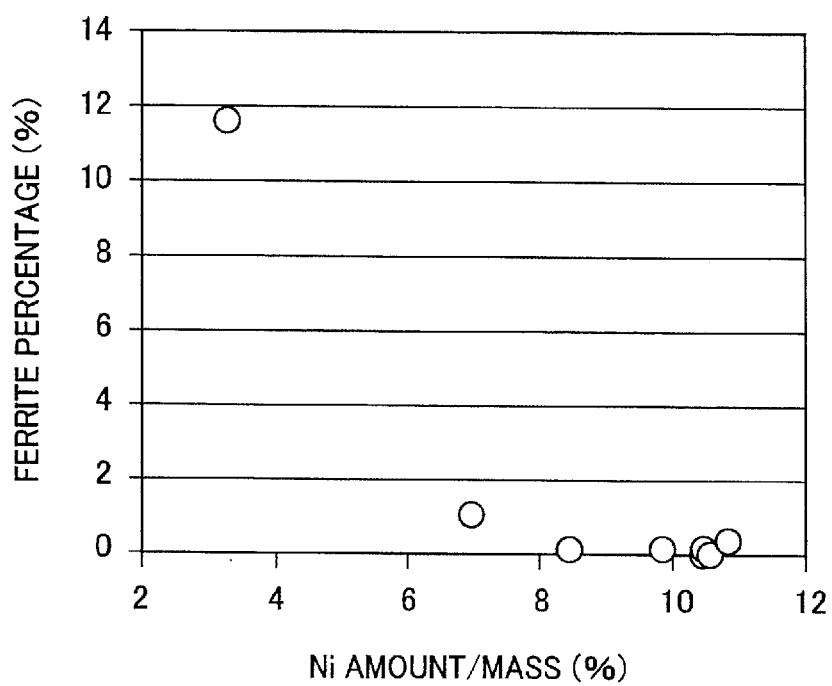
FIG. 4 is a graph illustrating relationships between the ferrite percentages and amounts of Ni contained in the heat-resistant cast steels in the embodiment of the present disclosure.

FIG. 4 is a graph illustrating relationships between the ferrite percentages and the amounts of Ni contained in the heat-resistant cast steels. In the graph of FIG. 4, the horizontal axis represents the amount of Ni contained in each heat-resistant cast steel while the vertical axis represents the ferrite percentage and each of white circles represents the ferrite percentage for the corresponding Ni amount. Note that FIG. 4 illustrates the relationships between the ferrite percentages and the Ni amounts in the heat-resistant cast steels of Example 1 to 8 and Comparative Example 6. The heat-resistant cast steel of Comparative Example 6 (Ni amount was 3.70 mass %) had a greater ferrite percentage than the heat-resistant cast steels of Examples 1 to 8. From this result, it was found that, when the Ni amount is less than 6 mass %, the amount of ferrite phase increases, meanwhile, when the Ni amount is 6 mass % or more, the ferrite percentage is 1.1% or less (including the case where the ferrite percentage is zero) and it is possible to reduce the amount of ferrite phase and increase the amount of austenite phase.

Figure 5:
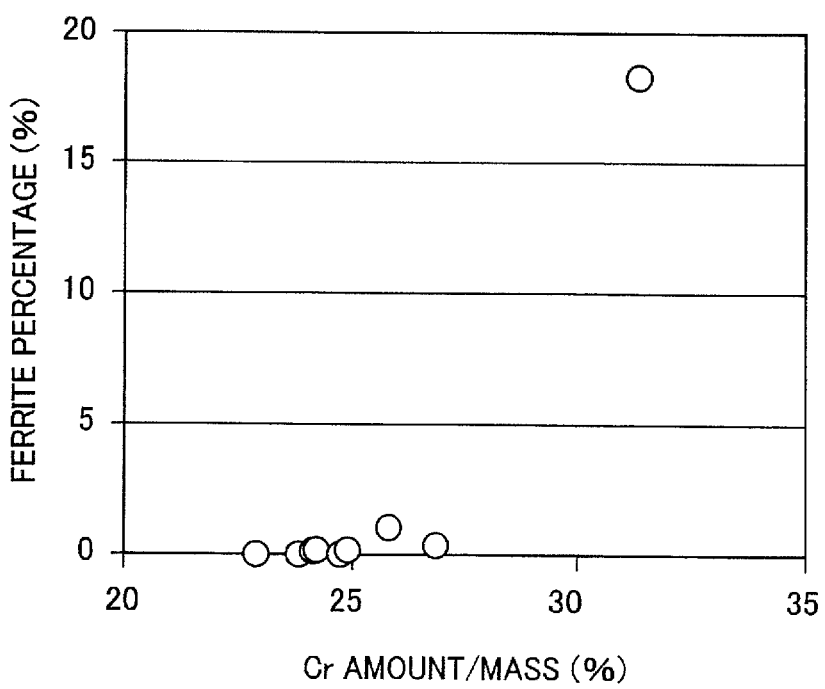
FIG. 5 is a graph illustrating relationships between the ferrite percentages and amounts of Cr contained in the heat-resistant cast steels in the embodiment of the present disclosure.

FIG. 5 is a graph illustrating relationships between the ferrite percentages and the amounts of Cr contained in the heat-resistant cast steels. In the graph of FIG. 5, the horizontal axis represents the amount of Cr contained in each heat-resistant cast steel while the vertical axis represents the ferrite percentage and each of white circles represents the ferrite percentage for the corresponding Cr amount. Note that FIG. 5 illustrates the relationships between the ferrite percentages and the Cr amounts in the heat-resistant cast steels of Example 1 to 8 and Comparative Example 7. The heat-resistant cast steel of Comparative Example 7 (Cr amount was 31.30 mass %) had a greater ferrite percentage than the heat-resistant cast steels of Examples 1 to 8. From this result, it was found that, when the Cr amount is more than 27 mass %, the amount of ferrite phase increases, meanwhile, when the Cr amount is 27 mass % or less, the ferrite percentage is 1.1% or less (including the case where the ferrite percentage is zero) and it is possible to reduce the amount of ferrite phase and increase the amount of austenite phase.

(Evaluation of Oxidation Resistance)

The oxidation resistance of each heat-resistant cast steel was evaluated. The oxidation resistance was evaluated based on "Method of cyclic oxidation testing at elevated temperatures for metallic materials" in JIS Z2282 and "General rules for high-temperature corrosion test for metallic materials" in JIS 22290. Specifically, each heat-resistant cast steel was first subjected to cyclic oxidation testing for 200 cycles in each of which the heat-resistant cast steel was heated at heating temperature of 980° C.±5° C. in an atmospheric environment with absolute humidity of 10% for 45 minutes and then cooled at a temperature below 200° C. for 30 minutes. An oxidation film was removed (descaled) after the cyclic oxidation testing and an amount of change in weight before and after the oxidation testing was obtained to calculate the weight loss amount after the oxidation testing (weight loss amount per unit area). Table 1 depicts the weight loss amount after the oxidation testing in each heat-resistant cast steel.

The weight loss amount after the oxidation testing in the heat-resistant cast steels of Examples 1 to 8 was about 5 mg·cm$^{-2}$ to about 19 mg·cm$^{-2}$. Meanwhile, the weight loss amount after the oxidation testing in the heat-resistant cast steel of Comparative Example 1 (Si amount was 0.95 mass %, Mn amount was 3.21 mass %) was about 304 mg·cm$^{-2}$ and the oxidation resistance was lower than those of the heat-resistant cast steels of Examples 1 to 8. From this result, it was found that, when the Si amount is less than 1.5 mass %, the oxidation resistance decreases and, when the Si amount is 1.5 mass % or more, the oxidation resistance increases. Moreover, it was found that, when the Mn amount is more than 2 mass %, the oxidation resistance decreases and, when the Mn amount is 2 mass % or less, the oxidation resistance increases.

Moreover, the weight loss amount after the oxidation testing in the heat-resistant cast steel of Comparative Example (Cr amount was 21.92 mass %) was about 94 mg·cm$^{-2}$ and the oxidation resistance was lower than those of the heat-resistant cast steels of Examples 1 to 8. From this result, it was found that, when the Cr amount is less than 22 mass %, the oxidation resistance decreases and, when the Cr amount is 22 mass % or more, the oxidation resistance increases.

(Evaluation of Hardness)

The hardness of each heat-resistant cast steel was measured. The hardness measurement was performed by measuring the Vickers hardness at room temperature. The Vickers hardness was measured according to JIS Z2244 "Vickers hardness test-Test method" and JIS 27725 "Vickers hardness test-Verification and calibration of testing machines". A diamond indenter (square pyramid, angle between opposite faces was 136°±10.5°) was used as the indenter. The test load was 10 kgf (98 N). Pressing time after stop was 10 seconds. Table 1 depicts the hardness of each heat-resistant cast steel. The hardness of heat-resistant cast steels of Examples 1 to 8 was Hv 199 to Hv 234. Meanwhile, the hardness of the heat-resistant cast steel of Comparative Example 3 (C amount was 1.13 mass %) was Hv 240. From this result it was found that, when the C amount is more than 1.0 mass %, the hardness is too high and the processability such as machinability decreases, meanwhile, when the C amount is 1.0 mass % or less, the processability such as machinability increases.

Moreover, the hardness of the heat-resistant cast steels of Examples 1 to 4 and 8 was Hv 199 to Hv 215. The hardness of the heat-resistant cast steels of Examples 5 to 7 was Hv 218 to Hv 234. From this result, it was found that, when the content of C is 0.55 mass % or more and 0.8 mass % or less, the hardness decreases and the processability such as machinability further increases. Meanwhile, when the content of C is more than 0.8 mass % and 1.0 mass % or less, the hardness increases and the mechanical properties increase.

(Evaluation of Tensile Properties)

The high temperature tensile properties of each heat-resistant cast steel were evaluated based on "Method of elevated temperature tensile test" in JIS G0567. The test temperatures were set to 600° C. and 950° C. and the tensile strength, the 0.2% proof stress, and the elongation were measured. Table 1 depicts the results of the tensile properties (tensile strength, 0.2% proof stress, elongation) of each heat-resistant cast steel.

The tensile strength of the heat-resistant cast steels of Examples 1, 2, and 4 to 7 was 378 MPa to 446 MPa at 600° C. and was 106 MPa to 131 MPa at 950° C. The 0.2% proof stress was 173 MPa to 214 MPa at 600° C. and was 55 MPa to 73 MPa at 950° C. The elongation was 9.4% to 14.2% at 600° C. and was 37.6% to 52.3% at 950° C. As described above, it was found that each heat-resistant cast steel had excellent high temperature tensile properties.

Second Example

Next, heat-resistant cast steels containing S were casted and the mechanical properties (tensile properties, hardness), the ferrite percentage, the oxidation resistance, and the machinability thereof were evaluated. Table 2 depicts the alloy compositions of the casted heat-resistant cast steels.

TABLE 2

| | ALLOY COMPOSITION (MASS %) | | | | | | | OXIDATION WEIGH LOSS AMOUNT/mg·cm$^{-2}$ 980° C. | TENSILE STRENGTH/MPa 600° C. |
|---|---|---|---|---|---|---|---|---|---|
| | C | Si | Mn | Ni | Cr | Mo | S | Fe+ IMPURITIES | | |
| EXAMPLE 9 | 0.96 | 1.70 | 1.32 | 9.45 | 23.13 | 0.28 | 0.1 | BALANCE | 22 | 401 |
| EXAMPLE 10 | 0.95 | 1.75 | 1.42 | 9.47 | 23.46 | 0.28 | 0.16 | BALANCE | 21 | 404 |
| COMPARATIVE EXAMPLE 8 | 1.04 | 1.75 | 1.34 | 9.50 | 23.20 | 0.29 | — | BALANCE | 21 | 424 |

| | TENSILE STRENGTH/MPa 950° C. | 0.2% PROOF STRESS/MPa 600° C. | 0.2% PROOF STRESS/MPa 950° C. | ELONGATION/% 600° C. | ELONGATION/% 950° C. | HARDNESS Hv RT | FERRITE PERCENTAGE/% RT |
|---|---|---|---|---|---|---|---|
| EXAMPLE 9 | 118 | 195 | 65 | 10.0 | 38.0 | 229 | 0.00 |
| EXAMPLE 10 | 119 | 195 | 67 | 10.0 | 35.0 | 228 | 0.12 |
| COMPARATIVE EXAMPLE 8 | 122 | 202 | 67 | 9.0 | 38.0 | 247 | 0.00 |

First, the alloy composition of each heat-resistant cast steel is described. The alloy compositions of the heat-resistant cast steels in Examples 9 and 10 were each configured to contain 0.55 mass % or more and 1.0 mass % or less C, 1.5 mass % or more and 3.5 mass % or less Si, more than 0 mass % and 2 mass % or less Mn, 6 mass % or more and 11 mass % or less Ni, 22 mass % or more and 27 mass % or less Cr, more than 0 mass % and 0.6 mass % or less Mo, more than 0 mass % and 0.2 mass % or less S, and the balance being Fe and unavoidable impurities. The heat-resistant cast steel of Comparative Example 8 was configured to contain no S and effects of adding S were evaluated. Each heat-resistant cast steel was casted by melting an alloy raw material in a high-frequency induction furnace and pouring it into a sand mold in the air atmosphere.

(Evaluation of Ferrite Percentage)

The ferrite percentage of each heat-resistant cast steel was measured. The ferrite percentage of each heat-resistant cast steel was measured in the same method as that in the first example. Table 2 depicts the ferrite percentage of each heat-resistant cast steel. The ferrite percentage of the heat-resistant cast steel was 0.00% in Example 9, 0.12% in Example 10, and 0.00% in Comparative Example 8. The ferrite percentage in the heat-resistant cast steels of Examples 9 and was about the same as the ferrite percentage in the heat-resistant cast steels of Examples 1 to 8. Accordingly, it was found that the formation of the ferrite phase is suppressed also when more than 0 mass % and 0.2 mass % or less of S is added.

(Evaluation of Oxidation Resistance)

The oxidation resistance of each heat-resistant cast steel was evaluated. The oxidation resistance of each heat-resistant cast steel was evaluated in the same method as that in the first example. Table 2 depicts the weight loss amount after the oxidation testing in each heat-resistant cast steel. The weight loss amount after the oxidation testing in the heat-resistant cast steel was 22 mg·cm$^{-2}$ in Example 9, 21 mg·cm$^{-2}$ in Example 10, and 21 mg·cm$^{-2}$ in Comparative Example 8. The oxidation resistance of the heat-resistant cast steels in Examples 9 and 10 was about the same as the oxidation resistance of the heat-resistant cast steels in Examples 1 to 8.

(Evaluation of Hardness)

The hardness of each heat-resistant cast steel was measured. The hardness of each heat-resistant cast steel was measured by measuring the Vickers hardness at room temperature in the same method as that in the first example. Table 2 depicts the hardness of each heat-resistant cast steel. The hardness of the heat-resistant cast steel was Hv 229 in Example 9, Hv 228 in Example 10, and Hv 247 in Comparative Example 8. The hardness of the heat-resistant cast steels of Examples 9 and 10 was about the same as the hardness of the heat-resistant cast steels of Examples 1 to 8.

(Evaluation of Tensile Properties)

The high temperature tensile properties of each heat-resistant cast steel were evaluated. The tensile properties of each heat-resistant cast steel were evaluated in the same method as that in the first example. Table 2 depicts the results of the tensile properties (tensile strength, 0.2% proof stress, elongation) of each heat-resistant cast steel. The tensile strength of the heat-resistant cast steel at 600° C. was 401 MPa in Example 9, 404 MPa in Example 10, and 424 MPa in Comparative Example 8. The 0.2% proof stress of the heat-resistant cast steel at 600° C. was 195 MPa in Example 9, 195 MPa in Example 10, and 202 MPa in Comparative Example 8. The elongation of the heat-resistant cast steel at 600° C. was 10.0° in Example 9, 10.0% in Example 10, and 9.0% in Comparative Example 8. The tensile strength of the heat-resistant cast steel at 950° C. was 118 MPa in Example 9, 119 MPa in Example 10, and 122 MPa in Comparative Example 8. The 0.2% proof stress of the heat-resistant cast steel at 950° C. was 65 MPa in Example 9, 67 MPa in Example 10, and 67 MPa in Comparative Example 8. The elongation of the heat-resistant cast steel at 950° C. was 38.0% in Example 9, 35.0% in Example 10, and 38.0% in Comparative Example 8. The tensile properties of the heat-resistant cast steels in Examples 9 and 10 were about the same as the tensile properties of the heat-resistant cast steels in Examples 1 to 8.

(Evaluation of Machinability)

Figure 6:
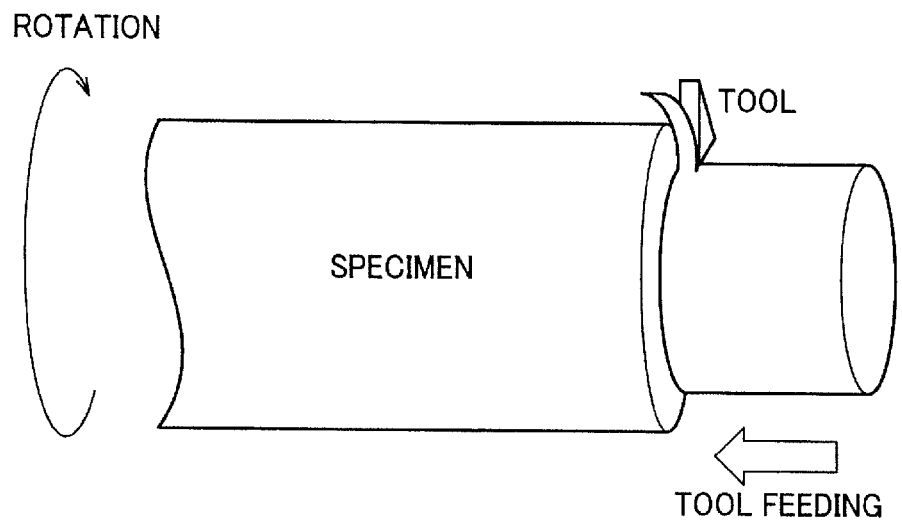
FIG. 6 is a view for explaining a machinability evaluation test method in the embodiment of the present disclosure.

The machinability of each heat-resistant cast steel was evaluated. First, a machinability evaluation test method is described. FIG. 6 is a view for explaining the machinability evaluation test method. The machinability evaluation test method was executed by performing a turning process test. Each heat-resistant cast steel was formed in a columnar shape to form a specimen. A tool with an edge coated with carbide was used to cut a side surface of the specimen. A lathe was rotated at a predetermined rotation speed and a photograph of the tool was captured every predetermined time to measure wear depth of the tool. The turning process peripheral speed (cutting speed) was 50 m/sec. Then, the machinability was evaluated based on a notch wear amount (tool wear amount) for certain processing time.

Figure 7:
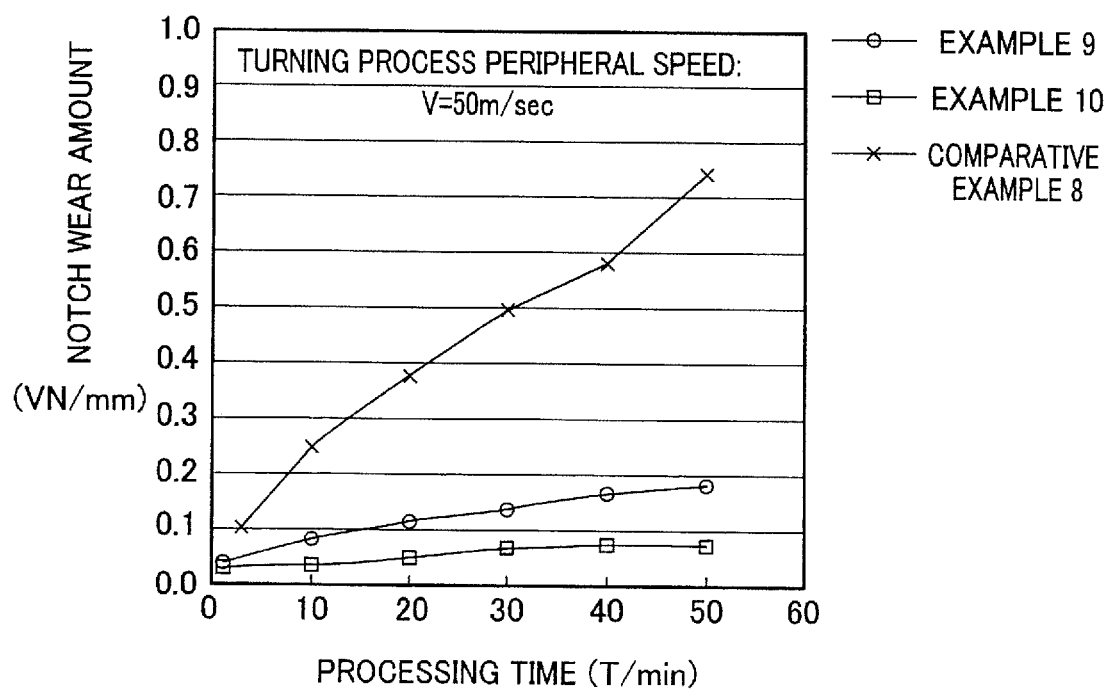
FIG. 7 is a graph illustrating results of the machinability evaluation test for each heat-resistant cast steel in the embodiment of the present disclosure.

Next, the results of the machinability evaluation test for each heat-resistant cast steel are described. FIG. 7 is a graph illustrating the results of the machinability evaluation test for each heat-resistant cast steel. In the graph of FIG. 7, the horizontal axis represents the processing time (T) while the vertical axis represents the notch wear amount (VN). Moreover, white circles represent the results for the heat-resistant cast steel of Example 9, white squares represent the results for the heat-resistant cast steel of Example 10, and cross symbols represents the results for the heat-resistant cast steel of Comparative Example 8. In the heat-resistant cast steels of Examples 9 and 10, the notch wear amount for each processing time was small. Meanwhile, in the heat-resistant cast steel of Comparative Example 8, the notch wear amount for each processing time was large. From these results, it was found that the machinability can be improved by adding S to the heat-resistant cast steel. Moreover, it was found that, since the heat-resistant cast steel of Example 10 had a smaller notch wear amount than the heat-resistant cast steel of Example 9, the heat-resistant cast steel can be further improved in the machinability by containing more S.

INDUSTRIAL APPLICABILITY

According to the present disclosure, there is no need to use the pressure casting method and the manufacturing cost of the heat-resistant cast steel can be thus reduced. Accordingly, the present disclosure is useful for parts such as turbocharger parts for a vehicle.

What is claimed is:

1. A heat-resistant cast steel consisting of:
0.55 mass % or more and 1.0 mass % or less C;
1.5 mass % or more and 3.5 mass % or less Si;
more than 0 mass % and 2 mass % or less Mn;
6 mass % or more and 11 mass % or less Ni;
24.05 mass % or more and 25.74 mass % or less Cr;
more than 0 mass % and 0.6 mass % or less Mo; and
the balance being Fe and unavoidable impurities.

2. The heat-resistant cast steel according to claim 1, wherein a content of C is 0.55 mass % or more and 0.8 mass % or less.

3. The heat-resistant cast steel according to claim 1, wherein a content of C is more than 0.8 mass % and 1.0 mass % or less.

4. The heat-resistant cast steel according to claim 1, wherein a content of Si is 1.5 mass % or more and 2.5 mass % or less.

5. The heat-resistant cast steel according to claim 2, wherein a content of Si is 1.5 mass % or more and 2.5 mass % or less.

6. The heat-resistant cast steel according to claim 3, wherein a content of Si is 1.5 mass % or more and 2.5 mass % or less.

7. A heat-resistant cast steel consisting of:
0.55 mass % or more and 1.0 mass % or less C;
1.5 mass % or more and 3.5 mass % or less Si;
more than 0 mass % and 2 mass % or less Mn;
6 mass % or more and 11 mass % or less Ni;
24.05 mass % or more and 25.74 mass % or less Cr;
more than 0 mass % and 0.6 mass % or less Mo;
more than 0 mass % and 0.2 mass % or less S; and
the balance being Fe and unavoidable impurities.

8. The heat-resistant cast steel according to claim 7, wherein a content of C is 0.55 mass % or more and 0.8 mass % or less.

9. The heat-resistant cast steel according to claim 7, wherein a content of C is more than 0.8 mass % and 1.0 mass % or less.

10. The heat-resistant cast steel according to claim 7, wherein a content of Si is 1.5 mass % or more and 2.5 mass % or less.

11. The heat-resistant cast steel according to claim 8, wherein a content of Si is 1.5 mass % or more and 2.5 mass % or less.

12. The heat-resistant cast steel according to claim 9, wherein a content of Si is 1.5 mass % or more and 2.5 mass % or less.

13. The heat-resistant cast steel according to claim 7, wherein a content of S is 0.1 mass % or more and 0.2 mass % or less.

14. The heat-resistant cast steel according to claim 8, wherein a content of S is 0.1 mass % or more and 0.2 mass % or less.

15. The heat-resistant cast steel according to claim 9, wherein a content of S is 0.1 mass % or more and 0.2 mass % or less.

16. The heat-resistant cast steel according to claim 10, wherein a content of S is 0.1 mass % or more and 0.2 mass % or less.

17. The heat-resistant cast steel according to claim 11, wherein a content of S is 0.1 mass % or more and 0.2 mass % or less.

18. The heat-resistant cast steel according to claim 12, wherein a content of S is 0.1 mass % or more and 0.2 mass % or less.

19. A turbocharger part made of the heat-resistant cast steel according to claim 1.

20. The heat-resistant cast steel according to claim 1, wherein a content of Ni is 9.4 mass % or more and 11 mass % or less.

21. The heat-resistant cast steel according to claim 1, wherein a content of Mo is 0.27 mass % or more and 0.6 mass % or less.

\* \* \* \* \*